(12) United States Patent
Will et al.

(10) Patent No.: US 6,424,518 B1
(45) Date of Patent: Jul. 23, 2002

(54) ALUMINUM ELECTROLYTIC CAPACITOR

(75) Inventors: Norbert Will, Heidenheim; Walter Riedesser, Neustadt, both of (DE)

(73) Assignee: Epcos AG, Müchen (DE)

( * ) Notice: Subject to any disclaimer, the term of this patent is extended or adjusted under 35 U.S.C. 154(b) by 0 days.

(21) Appl. No.: 09/787,869

(22) PCT Filed: Sep. 16, 1999

(86) PCT No.: PCT/DE99/02962

§ 371 (c)(1),
(2), (4) Date: Jun. 26, 2001

(87) PCT Pub. No.: WO00/17899

PCT Pub. Date: Mar. 30, 2000

(30) Foreign Application Priority Data

Sep. 22, 1998 (DE) .......................................... 198 43 467

(51) Int. Cl.⁷ ............................ H01G 9/042; H01G 9/02
(52) U.S. Cl. ........................ 361/509; 361/512; 361/517
(58) Field of Search ................................ 361/508, 509, 361/511, 512, 516, 517, 518, 519

(56) References Cited

U.S. PATENT DOCUMENTS

| | | | | |
|---|---|---|---|---|
| 4,622,612 A | * | 11/1986 | Tanouchi et al. | ........... 361/512 |
| 5,245,513 A | * | 9/1993 | Maijers et al. | .............. 361/520 |
| 6,118,651 A | * | 9/2000 | Mehrotra et al. | ........... 361/509 |

FOREIGN PATENT DOCUMENTS

JP  59 032121  2/1984

* cited by examiner

*Primary Examiner*—Anthony Dinkins
(74) *Attorney, Agent, or Firm*—Schiff Hardin & Waite

(57) ABSTRACT

An aluminum electrolyte capacitor is composed of a capacitor winding, of an anode foil provided with a dielectrically effective barrier layer, having spacers (1), particularly of paper, saturated with an operating electrolyte, and of a cathode foil, and is built into a housing. The spacers have an impressed line structure (2) that is arranged from one face end of the capacitor winding to the opposite end face.

6 Claims, 1 Drawing Sheet

ALUMINUM ELECTROLYTIC CAPACITOR

BACKGROUND OF THE INVENTION

1. Field of the Invention

The invention is directed to an aluminum electrolytic capacitor that comprises a capacitor winding, an anode foil provided with a dielectrically effective barrier layer having a spacer (particularly of paper saturated with operating electrolytic), and a cathode foil, and that is built into a housing.

2. Background of the Invention

These types of capacitors are initially wound dry, and the capacitor winding is subsequently impregnated with the operating electrolytic in a bath. The electrolytic penetrates into the inside of the capacitor via the two end faces of the winding. The region that is impregnated last in the winding (usually the middle winding region) is impregnated poorest, particularly when impregnating capacitor windings with large diameters, for example, electrolytic capacitors whose cup housing comprises a screw connection, . The development of gas connected with it has a negative influence on the use duration of the capacitor.

In order to eliminate this problem, the impregnation temperatures can be lowered, for example. However, this increases the impregnation time, thus requiring an expensive investment.

An improvement of the impregnation quality can also be achieved by utilizing papers with a lower density. In order to achieve an adequate dielectric strength, however, these papers must be thicker, resulting in the dimensions of the capacitor winding often becoming too big.

There are also impregnation papers in the marketplace having the name PDHX that have been available since about the end of the 1980's and that are shaped like a corrugated sheet (i.e., repeat patterning). A 50 µm paper having a density of 0.6 g/cm³ is formed from a 40 µm paper having a density of 0.75 g/cm³. Since, however, this paper is elastic, problems arise when cutting or in the re-reeling connected with it. Moreover, an improvement of the impregnation can only be achieved with this paper under specific impregnation conditions.

The described problems do not arise given vacuum impregnation of very small electrolytic capacitors (winding length <20 mm).

SUMMARY OF THE INVENTION

An object of the present invention is to provide an electrolytic capacitor in which impregnation conditions similar to those in small electrolytic capacitors can also be produced in a large capacitor winding and in which the winding impregnation is improved without lengthening the impregnation time.

This object is inventively achieved in that the spacers have an impressed line structure that is arranged from one end face of the capacitor winding to the opposite end face.

Advantageous developments of the invention are explained in greater detail below with reference to exemplary embodiments.

DETAILED DESCRIPTION OF THE INVENTION

Figure 1:
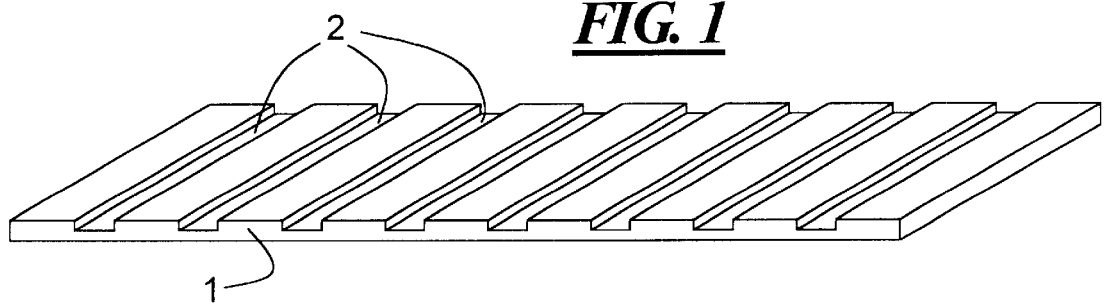
FIG. 1 is a pictorial view of a paper with an impressed line structure.

FIG. 1 shows a paper that comprises an impressed line structure, where the impressing is arranged at only one paper side. The depression lines 2 are arranged transversely relative to the paper web, so that the lines 2 extend to both end faces of the winding in the capacitor winding and thus serve as impregnation channels along the winding axis. This design enables a significantly faster impregnation of the capacitor winding. In addition to this faster impregnation through the impregnation channels, the impregnation front is enlarged or broadened, i.e., the boundary surface between the impregnated and the as yet unimpregnated region is larger in the impregnation event given the paper of the invention. The absorption capability of the electrolytic with respect to the electrolytic vapor and remaining air in the winding is thus higher, so that a more uniform impregnation ensues.

A capacitor winding was produced with a paper that was 50 µm thick and that had a g.s.m. of 27 g/cm². The lines were approximately 20 µm deep and 220 µm wide and were arranged in a 1 mm grid. For comparison, a capacitor winding having a paper of the same thickness and the same g.s.m. but without lines was installed as a first paper ply in a high-voltage electrolytic capacitor and tested. Filler paper having a density >0.7 g/cm³ and an overall thickness of 40 µm was utilized as second and third paper ply in both groups.

The capacitor winding with the standard papers was impregnated in a standard program, whereas the winding with the structured paper was capable of being impregnated with reduced temperature because the increased impregnation rate allowed this as a result of the structured paper without having to lengthen the overall impregnation time.

Under the overload condition 0 V/125°, so much gas was generated in the standard electrolytic capacitor that the rated break point in the housing responded after 400 h. The electrolytic capacitor having the structured paper of the invention, however, still had no indications of an excess pressure even after 700 h. Further electrolytic capacitors under more moderate test conditions still had not exhibited any failures after 700 h.

Since the paper has impregnation channels at only one side, the full mechanical stability is preserved, in contrast to the initially cited corrugated paper that has channels at both sides because of its corrugated shape and is therefore stretchable.

Given capacitor windings with a structured paper according to the invention, thus, a better and faster impregnation given the same dielectric strength and same mechanical quality is enabled than with a standard paper of comparable thickness and dielectric strength.

Figure 2:
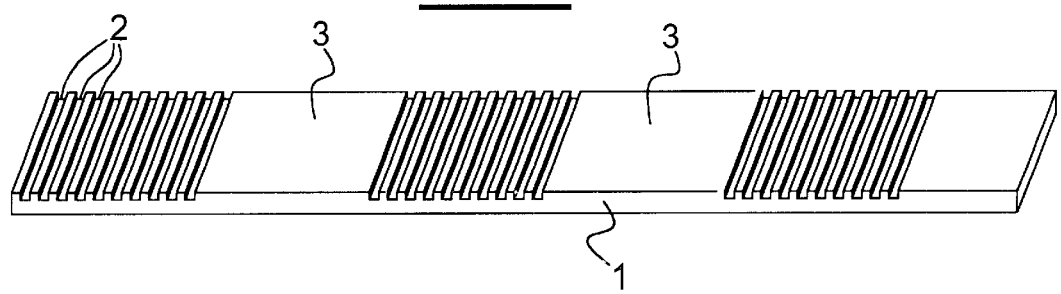
FIG. 2 is a pictorial view of a paper with periodically arranged line structure.

FIG. 2 shows a paper 1 in which regions of eight lines 2 in the 1 mm grid periodically alternate with 8 mm wide regions without lines 3. Given this paper, the impregnation (even with low-viscosity electrolytic) ensues first in the line region and only then in the intervening region. As a result of this, only narrow, poorly impregnated zones initially arise between the line regions. A uniform impregnation quality is again achieved by compensation diffusion, which must ensue here over approximately 4 mm, i.e., this impregnation is comparable to the more uniform impregnation quality of small electrolytic capacitor windings. Even with low-viscosity electrolytes, an enlarged boundary surface between the electrolyte and the regions provisionally filled only with air and vapor can be achieved due to the superstructure. Another advantage of this superstructure is that the gas that is generated by the leakage current during operation of the electrolytic capacitor can flow off via the channels and thereby expresses less electrolyte out of the winding.

In another embodiment, it is possible to arrange the impregnation channels obliquely (shifted approximately 10–30° relative to the winding axis), so that all regions that are less optimally impregnated are likewise obliquely fashioned. During operation, when the structure in the paper is weakened due to swelling processes, electrolyte and gas flows in the electrolytic capacitor can proceed via these more lightly impregnated regions and thus effect a mixing.

During operation of an electrolytic capacitor, all electrolytic movements (for example, given temperature changes) and gas flows proceed from the middle of the winding. I.e., the electrolytic exchange is lowest in the middle of the capacitor. It is therefore important that it is precisely this region that has the best impregnation and not, as in the prior art, the poorest.

Figure 3:
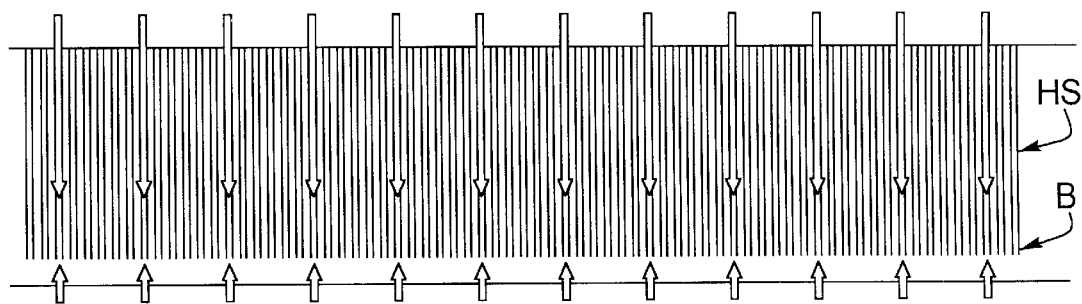
FIG. 3 is a pictorial diagram showing the impregnation given a differently fashioned paper structure.

The paper structure can also be fashioned such that, as shown in FIG. 3, the impregnation ensues faster from one side (for example, from the upper end face of the winding). The two impregnation fronts thus meet one another in the lower winding region B. As a result, the more lightly impregnated region does not arise in the middle of the winding in the region of the "hot spot" HS but, for example, in the lower winding half. this deficiency can be compensated better in the lower half due to the electrolytic movements that are present there. Given an alternating current load of the electrolytic capacitor, moreover, the hottest adjunct area (hot spot) and, thus, the critical region in the winding, is at the top. The most sensitive regions are thus optimally impregnated as a result of the paper structure of the invention.

Figure 4:
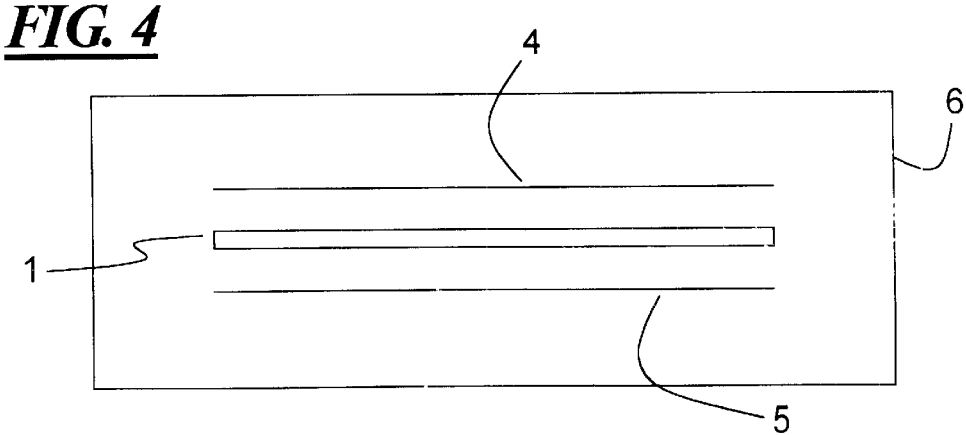
FIG. 4 is a pictorial diagram of the inventive capacitor having the inventive barrier layer within a housing.

The invention can be built utilizing a conventional aluminum electrolytic capacitor construction according to FIG. 4 that includes a housing 6, an anode 4, a cathode 5, and a barrier layer 1 (w/ spacer).

The above-described capacitor is illustrative of the principles of the present invention. Numerous modifications and adaptations will be readily apparent to those skilled in this art without departing from the spirit and scope of the present invention.

What is claimed is:
1. An aluminum electrolytic capacitor comprising:
 a capacitor winding comprising:
 an anode foil;
 a dielectrically effective barrier layer having a spacer made of paper saturated with operating electrolyte having an impressed line structure that is arranged from one end face of the capacitor winding to the opposite end face, said line structure being arranged only on one surface of said spacer; and
 a cathode foil; said capacitor further comprising:
 a housing into which is built said anode foil, said barrier layer, and said cathode foil.
2. The aluminum electrolytic capacitor according to claim 1, wherein said line structure periodically alternates with regions without structure.
3. The aluminum electrolytic capacitor according to claim 1, wherein said line structure is uniformly arranged on the entire said spacer.
4. The aluminum electrolytic capacitor according claim 1, wherein said line structure is arranged parallel to an axis of said capacitor winding.
5. The aluminum electrolytic capacitor according to claim 1, wherein said line structure is arranged at an angle relative to an axis of said winding.
6. An aluminum electrolytic capacitor comprising:
 a capacitor winding comprising:
 an anode foil;
 a dielectrically effective barrier layer having a spacer made of paper saturated with operating electrolyte having an impressed line structure that is arranged from one end face of the capacitor winding to the opposite end face, said line structure being arranged on a surface of said spacer; and
 a cathode foil; said capacitor further comprising:
 a housing into which is built said anode foil, said barrier layer, and said cathode foil;
 wherein individual lines of said line structure are approximately 20 $\mu$m deep and approximately 220 $\mu$m wide and are arranged at a spacing of approximately 1 mm given a thickness of 50 $\mu$m for said paper spacer.

* * * * *